US007684437B2

(12) United States Patent
Miller et al.

(10) Patent No.: US 7,684,437 B2
(45) Date of Patent: Mar. 23, 2010

(54) SYSTEM AND METHOD PROVIDING FIXED RATE TRANSMISSION FOR DIGITAL VISUAL INTERFACE AND HIGH-DEFINITION MULTIMEDIA INTERFACE APPLICATIONS

(75) Inventors: Rod Miller, Kernersville, NC (US); Paul Lanier, Kernersville, NC (US)

(73) Assignee: Analog Devices, Inc., Norwood, MA (US)

( * ) Notice: Subject to any disclaimer, the term of this patent is extended or adjusted under 35 U.S.C. 154(b) by 894 days.

(21) Appl. No.: 11/087,786

(22) Filed: Mar. 23, 2005

(65) Prior Publication Data

US 2006/0215651 A1 Sep. 28, 2006

(51) Int. Cl.
*H04J 3/22* (2006.01)

(52) U.S. Cl. ........................ 370/466; 345/698; 345/2.1; 345/3.3; 348/443; 348/445; 348/455; 370/270; 370/350; 370/395.1

(58) Field of Classification Search ................ 327/145; 348/194; 341/61, 143; 370/392, 389; 725/126; 345/213
See application file for complete search history.

(56) References Cited

U.S. PATENT DOCUMENTS 5,668,810 A * 9/1997 Cannella, Jr. ............... 370/392
5,892,468 A * 4/1999 Wilson et al. ................. 341/61
2002/0191924 A1 12/2002 Matsuyama
2004/0001057 A1* 1/2004 Myers ........................ 345/213
2004/0221315 A1* 11/2004 Kobayashi .................. 725/126
2006/0077288 A1* 4/2006 Wu ............................ 348/441

* cited by examiner

*Primary Examiner*—Patrick N Edouard
*Assistant Examiner*—David Wang
(74) *Attorney, Agent, or Firm*—Kenyon & Kenyon LLP

(57) ABSTRACT

A system and method transmits graphic data received at varying frequencies at a fixed data rate. The frequency dependent data and associated data clock signal are received and the frequency dependent data is converted to frequency independent data. A ratio of a number of data clock cycles to a number of reference clock cycles is determined and transmitted. The frequency independent data and header data are transmitted, at a fixed rate, to a receiver, the fixed rate being a frequency greater than the frequency of the associated data clock signal. The received the frequency independent data is converted to frequency dependent data based upon the received determined ratio. The communication channel may include an optical fiber and a tension member wherein control data is transmitted along the tension member and graphic data is transmitted along the optical fiber.

23 Claims, 15 Drawing Sheets

SYSTEM AND METHOD PROVIDING FIXED RATE TRANSMISSION FOR DIGITAL VISUAL INTERFACE AND HIGH-DEFINITION MULTIMEDIA INTERFACE APPLICATIONS

FIELD OF THE PRESENT INVENTION

The present invention is directed to a method and system for transmitting video data over a reduced number of digital visual and/or high definition media interface channels.

BACKGROUND OF THE PRESENT INVENTION

Digital Visual Interface and High-Definition Multimedia Interface are high speed serial interconnect standards to transmit graphical data from a source to some type of display. The standards operate over a large range of data rates at very low differential voltage levels. The interface connection is limited to relatively short distance due to the combination of high data rates (250 Mb/s to 1.65 Gb/s), low voltage swings (800 mV), reflections with the signal due to cable and connectors, and compatibility issues between manufactures of the transmitters and receivers.

One solution to the limitation of a relatively short distance is to transmit the Digital Visual Interface and/or High-Definition Multimedia Interface data over an optical fiber to increase the distance between the source and display. This solution is realized by converting each electrical bit into an optical on/off state using a laser. The receiver at the other end of the fiber will use an optical detector and electronics to convert the optical state into an electrical state.

However, this solution requires that each electrical channel be mapped 1:1 to an optical fiber channel. In current graphic and video applications using Digital Visual Interface and/or High-Definition Multimedia Interface, three channels are utilized for graphic data, a single channel for the clock, a single channel for upstream control data, and a single channel for down stream control data.

FIG. 1 illustrates an example of this conventional system. In FIG. 1, a digital video source 20 is optically connected to a display device 30 through an optical cable 10. This system requires numerous lasers, detectors, and fibers to establish a link between the source 20 and display 30.

As illustrated in FIG. 2, the system of FIG. 1 requires numerous fibers that add cost to the system. In FIG. 2, the optical cable 100 includes three fiber (A, B, C) for graphic data, a single fiber (D) for the clock, a single fiber (E) for upstream control data, and a single fiber (F) for down stream control data. It is noted that a fewer number of fibers can be used, but in such configurations, the control data and return data are omitted from the system, thereby not complying with the specification of Digital Visual Interface and/or High-Definition Multimedia Interface.

As noted above, optical fibers can be employed to transmit high volume of information fast and reliably. The optical fibers include silica optical fibers, such as silica single-mode optical fibers, plastic optical fibers, and other fibers. In particular, the plastic optical fibers have a larger diameter than the silica single-mode optical fibers and are excellent in flexibility. From this viewpoint, the optical cables, which employ plastic optical fibers has optical transmission lines, are excellent in workability in end treatment and connection treatment of the optical fibers needed during installation, and in wiring. The optical cables are effective as a short distance trunk in a building after lead-in from a trunk cable, a branch cable, or a line cable for a LAN system.

The optical cables are usually configured to cover optical fibers and tensile strength reinforcing members (tension members) for avoiding elongation of the optical fibers due to tension with a sheath. In general, the optical fibers have a primary resin covering applied on a surface to prevent disturbance light from entering, to avoid damage due to a mechanical external force, or for another reason. In the case of optical cables for communication, two or more optical fibers for both input and output are usually housed.

As noted above, some optical cables use added tension members within the sheath of the optical fiber assembly to provide greater tensile stiffness than the fiber used in the assembly. This is needed to help reduce cable stress that will in time add additional loss in the fiber. Adding the extra tension member to the fiber assembly is commonly used with plastic optical fiber, but can be used with any fiber type that can benefit from the added tensile strength.

With respect to another example of a conventional Digital Visual Interface and/or High-Definition Multimedia Interface system, the data transfer system sends data back and forth from point A to point B; however, the data transfer system does not send the same amount of data in one direction as in the other direction. More specifically, in the conventional system, Point A could be sending data at 2 Gb/s to point B, but Point B is only sending 1 Mb/s of data to Point A. Typically, this type of system would require two fiber channels, one for the high speed downstream data and one for low speed upstream data, or a single mode system that creates bi-directional data stream with two different wavelengths, which adds additional circuitry.

Moreover, graphic applications operate at different clock rates for different display resolutions. However in many data transfer architectures it is beneficial to transmit the data at a fixed data rate. The problem in realizing this benefit is providing an adequate conversion of the variable rate data being received by the converter to a fixed data rate for actual transmission, and then a conversion of the fixed rate data back to a variable rate data without loss.

Lastly, Digital Visual Interface and/or High-Definition Multimedia Interface systems send graphic data and control data from the source to the display, as well as, sending control data from the display to the source. The graphic data, conventionally, is transmitted at a high data rate, while the control information is transmitted at a lower data rate. Since control data is flowing in both directions, the conventional systems have utilized bi-directional links. However, utilization of bi-directional links adds an extra channel to the communication cable, thereby increasing its costs.

Therefore, it is desirable to provide a Digital Visual Interface and/or High-Definition Multimedia Interface system that provides a fixed rate of data transmission between a source and a display with a proper conversion from a variable data rate to a fixed data rate and back to a variable data rate without loss of data.

Moreover, it is desirable to provide a Digital Visual Interface and/or High-Definition Multimedia Interface system that utilizes a communication cable that provides bi-directional communication of the control data without increasing the cable's cost.

Also, it is desirable to provide a Digital Visual Interface and/or High-Definition Multimedia Interface system that utilizes bi-directional communication of the control data without increasing the cost of the system.

It is further desirable to provide a Digital Visual Interface and/or High-Definition Multimedia Interface system that utilizes a protocol which enables the reduction of channels needed in a communication cable.

SUMMARY OF THE PRESENT INVENTION

A first aspect of the present invention is a method for transmitting varying frequency dependent data. The method receives frequency dependent data and associated data clock signal; converts the frequency dependent data to frequency independent data; determines a ratio of a number of data clock cycles to a number of reference clock cycles; transmits the determined ratio; transmits, at a fixed rate, the frequency independent data and header data to a receiver, the fixed rate being a frequency greater than the frequency of the associated data clock signal; receives the frequency independent data and the determined ratio; and converts the frequency independent data to frequency dependent data based upon the received determined ratio.

A second aspect of the present invention is a method for transmitting varying frequency dependent data. The method receives frequency dependent data having a pre-determined resolution format associated therewith; determines timing information from the received frequency dependent data; converts the received frequency dependent data to frequency independent data; encodes the frequency independent data with the determined timing information; transmits, at a fixed rate, the timing information encoded frequency independent data to a receiver; receives the timing information encoded frequency independent data; extracts timing information from the timing information encoded frequency independent data; and re-creates, based upon the extracted timing information, frequency dependent data having the pre-determined resolution associated therewith.

A third aspect of the present invention is a component for transmitting graphical data generated by a graphical data source to a display device. The component includes a circuit to receive frequency dependent data from the graphical data source, having a resolution format and a data clock frequency associated therewith, and to generate timing information encoded frequency independent data therefrom; and a transmitter to transmit the timing information encoded frequency independent data at a fixed rate to the display device.

A fourth aspect of the present invention is a system for transmitting graphical data generated by a graphical data source to a display device. The system includes a communication channel; a first circuit to receive frequency dependent data from the graphical data source, having a resolution format and a data clock frequency associated therewith, and to generate timing information encoded frequency independent data therefrom; and a first transmitter, operatively connected to the communication channel, to transmit the timing information encoded frequency independent data at a fixed rate; a second circuit, operatively connected to the communication channel, to receive the timing information encoded frequency independent data; a third circuit, operatively connected to the second circuit, to extract timing information from the timing information encoded frequency independent data and to re-create, based upon the extracted timing information, frequency dependent data having the pre-determined resolution associated therewith; and a second transmitter, operatively connected to the third circuit, to transmit the frequency dependent data having the pre-determined resolution associated therewith to a display device.

Another aspect of the present invention is a method for transmitting varying frequency dependent data. The method receives frequency dependent data and associated data clock signal; converts the frequency dependent data to frequency independent data; determines a ratio of a number of data clock cycles to a number of reference clock cycles; transmits the determined ratio; transmits, at a fixed rate, frequency independent data and header data to a receiver, the fixed rate being a frequency less than the frequency of the associated data clock signal; receives the frequency independent data and the determined ratio; and converts the frequency independent data to frequency dependent data based upon the received determined ratio.

Another aspect of the present invention is a system for transmitting graphical data generated by a graphical data source to a display device. The system includes a communication channel having an optical fiber, a sheath that surrounds the optical fiber to protect the optical fiber, and a tension member, located within the sheath, to provide tensile stiffness for the optical fiber; a first circuit to receive frequency dependent data from the graphical data source, having a predetermined resolution format and a data clock frequency associated therewith, and to generate timing information and frequency independent data therefrom; and a first transmitter, operatively connected to the communication channel, to transmit the timing information along the tension member at a fixed rate and the frequency independent data along said optical fiber at a fixed rate; a second circuit, operatively connected to the communication channel, to receive the timing information and the frequency independent data; a third circuit, operatively connected to the second circuit, to extract, based upon the received timing information, frequency dependent data having the pre-determined resolution associated therewith; and a second transmitter, operatively connected to the third circuit, to transmit the frequency dependent data having the pre-determined resolution associated therewith to a display device.

Another aspect of the present invention is a point-to-point communication cable. The point-to-point communication cable includes a first interface having first and second communication members to provide communication channels; a second interface having third and fourth communication members to provide communication channels; an optical fiber, operatively connected to the first communication member of the first interface and the third communication member of the second interface, to provide a communication channel between the first interface and the second interface; a sheath, surrounding the optical fiber, to protect said optical fiber; and a tension member, located within the sheath, to provide tensile stiffness for the optical fiber. The tension member, operatively connected to the second communication member of the first interface and the fourth communication member of the second interface, provides an electrical path between the first interface and the second interface.

Another aspect of the present invention is a communication system for providing a transfer of data between two devices. The communication system includes a point-to-point communication cable, the point-to-point communication cable having a first interface having first and second communication members to provide communication channels, a second interface having third and fourth communication members to provide communication channels, an optical fiber that is operatively connected to the first communication member of the first interface and the third communication member of the second interface to provide a communication channel between the first interface and the second interface, a sheath that surrounds the optical fiber to protect said optical fiber, and a first tension member, located within the sheath, to provide tensile stiffness for the optical fiber. The first tension member, operatively connected to the second communication member of the first interface and the fourth communication member of the second interface, provides an electrical path between the first interface and the second interface. The communication system further includes a current source, operatively connected to the second communication member, to provide a current onto the first tension member; a switch, operatively connected to the fourth communication member, to modulate the current flowing through the first tension member in response to data generated by a device connected to the second interface; and a current monitor, operatively connected to the second communication member, to monitor the modulated current and to generate a data signal in response thereto.

Another aspect of the present invention is a method for transferring graphical data from a source to a receiver. The method converts the frequency dependent data to frequency independent data; transmits, from a source, at a fixed rate, clock data corresponding to a source pixel clock frequency associated with frequency dependent data; transmits, from the source, at a fixed rate, frequency independent data; receives the frequency independent data and the clock data at the receiver; stores the received frequency independent data in a memory; re-creates, at the receiver, based upon the received clock data, a pixel clock signal having a frequency corresponding to the frequency of the source pixel clock frequency associated with frequency dependent data; and retrieves stored data from the memory using the re-created pixel clock signal to generate frequency dependent data.

Another aspect of the present invention is a system for recreating for transferring graphical data from a source to a receiver. The system includes a source of graphical data having a circuit to convert the frequency dependent data, associated with a source pixel clock frequency, to frequency independent data and a transmitter to transmit, at a fixed rate, clock data corresponding to a source pixel clock frequency associated with frequency dependent data and to transmit, at a fixed rate, frequency independent data; a receiver, communicatively connected to the source. The receiver includes a memory to store received frequency independent data; a digital clock synthesizer to re-create, based upon received clock data, a pixel clock signal having a frequency corresponding to the frequency of the source pixel clock frequency associated with frequency dependent data; and a retrieval circuit to retrieve the stored data from the memory using the re-created pixel clock signal to generate frequency dependent data.

Another aspect of the present invention is a component for converting frequency independent data into frequency dependent data. The component includes a receiver to receive, at a fixed data rate, frequency independent data; a memory to store frequency independent data; a digital clock synthesizer to re-create a pixel clock signal having a frequency corresponding to a frequency of a source pixel clock frequency associated with frequency dependent data; and a retrieval circuit to retrieve the stored data from the memory using the re-created pixel clock signal to generate frequency dependent data.

Another aspect of the present invention is a system for transmitting graphical data generated by a graphical data source to a display device. The system includes a communication channel; a first circuit to receive frequency dependent data from the graphical data source, having a predetermined resolution format and a data clock frequency associated therewith, and to generate timing information and frequency independent data therefrom; a first transmitter, operatively connected to the communication channel, to transmit the frequency independent data and timing information at a fixed rate; a second circuit, operatively connected to the communication channel, to receive the timing information and the frequency independent data; a memory to store the frequency independent data; a digital clock synthesizer to re-create, based upon received timing information, a pixel clock signal having a frequency corresponding to the frequency of the source pixel clock frequency associated with frequency dependent data; a retrieval circuit to retrieve the stored data from the memory using the re-created pixel clock signal to generate frequency dependent data; and a second transmitter, operatively connected to said retrieval circuit, to transmit the frequency dependent data having the pre-determined resolution associated therewith to a display device.

Another aspect of the present invention is a method for providing base band-directional graphic data communication between a graphic data source device and a display device. The method transmits display data and control data from the graphic data source device to the display device, over a first communication channel, during a data period and transmits return data from the display device to the graphic data source device, over the first communication channel, during a non-data period.

Another aspect of the present invention is a method for providing base band-directional graphic data communication between a graphic data source device and a display device. The method transmits a start of data period signal the graphic data source device to the display device over a first communication channel; transmits display data from the graphic data source device to the display device over a first communication channel; transmits a end of data period signal the graphic data source device to the display device over a first communication channel; and transmits, in response to the transmitted end of data period signal, return data from the display device to the graphic data source device over the first communication channel.

Another aspect of the present invention is a system for providing base band-directional graphic data communication. The system includes a graphic data source device to generate display data and control data; a display device to display the display data and to generate return data; and a first communication channel, operatively connected to the graphic data source device and the display device, to provide a communication channel therebetween. The graphic data source device includes a source transmitter to transmit a start of data period signal, an end of data period signal, and the display data; a source receiver to receive the return data; and a source switch, operatively connected to the source transmitter, the source receiver, and the first communication channel. The source switch connects the source transmitter to the first communication channel in response to the start of data period signal. The source switch connects the source receiver to the first communication channel in response to the end of data period signal. The display device includes a display transmitter to transmit return data; a display receiver to receive the start of data period signal, the end of data period signal, and the display data; and a source switch, operatively connected to the display transmitter, the display receiver, and the first communication channel. The display switch connects the display transmitter to the first communication channel in response to the end of data period signal. The display switch connects the display receiver to the first communication channel in response to the start of data period signal.

Another aspect of the present invention is a system for transmitting data between a remote central computing facility and a local workstation. The system includes a remote central computing facility including a plurality of primary processing devices; an electrical/optical interface, operatively connected to the remote central computing facility, to provide an individual communication channel for each primary processing device; a plurality of communication cables operatively connected to the electrical/optical interface; and a local workstation operatively connected to a communication cable.

Each communication cable includes an optical fiber, a sheath, surrounding the optical fiber, to protect the optical fiber, and a tension member, located within the sheath, to provide tensile stiffness for the optical fiber. The electrical/optical interface includes a first circuit to receive frequency dependent data from a graphical data source associated with a first primary processing device, having a predetermined resolution format and a data clock frequency associated therewith, and to generate timing information and frequency independent data therefrom and a first transmitter, operatively connected to a communication channel associated with the first primary processing device, to transmit, at a fixed rate, the timing information and the frequency independent data along the optical fiber. The local workstation includes a workstation interface; which includes a circuit, operatively connected to the communication cable, to receive the timing information and the frequency independent data, an extraction circuit, operatively connected to the circuit, to extract, based upon the received timing information, frequency dependent data having the pre-determined resolution associated therewith, and a display circuit, operatively connected to said extraction circuit, to transmit the frequency dependent data having the predetermined resolution associated therewith to a display device.

Another aspect of the present invention is a system for transmitting data between a remote central computing facility and a local workstation. The system includes a remote central computing facility including a plurality of primary processing devices; an electrical/optical interface, operatively connected to the remote central computing facility, to provide an individual communication channel for each primary processing device; a plurality of communication cables operatively connected to the electrical/optical interface; and a local workstation operatively connected to a communication cable. Each communication cable includes an optical fiber, a sheath, surrounding the optical fiber, to protect the optical fiber, and a tension member, located within the sheath, to provide tensile stiffness for the optical fiber. The electrical/optical interface includes a first circuit to receive frequency dependent data from a graphical data source associated with a first primary processing device, having a predetermined resolution format and a data clock frequency associated therewith, and to generate timing information and frequency independent data therefrom and a first transmitter, operatively connected to a communication channel associated with the first primary processing device, to transmit, at a fixed rate, the timing information and the frequency independent data along the optical fiber. The local workstation includes a workstation interface; which includes a circuit, operatively connected to the communication cable, to receive the timing information and the frequency independent data, a memory to store the frequency independent data, a digital clock synthesizer to re-create, based upon received timing information, a pixel clock signal having a frequency corresponding to the frequency of the source pixel clock frequency associated with frequency dependent data, a retrieval circuit to retrieve the stored data from the memory using the re-created pixel clock signal to generate frequency dependent data, and a display circuit, operatively connected to said extraction circuit, to transmit the frequency dependent data having the predetermined resolution associated therewith to a display device.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION OF THE DRAWINGS

Figure 1:
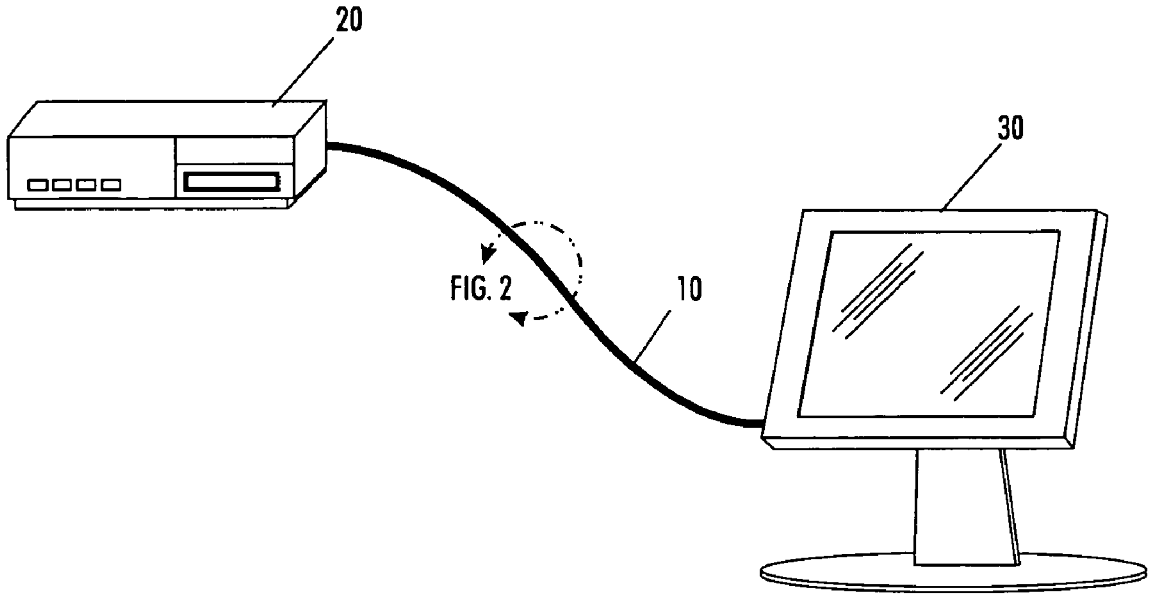
FIG. 1 (PRIOR ART)
FIG. 1 illustrates a prior art digital video data source/display system.
Figure 2:
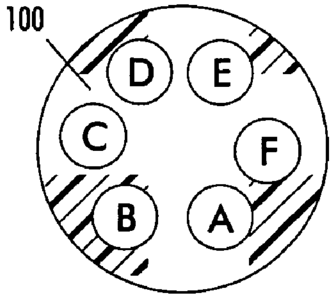
FIG. 2 (PRIOR ART)
FIG. 2 illustrates a prior art communication cable, used in FIG. 1, for carrying digital video data.

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention, as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions have been purposely drawn disproportionately so that the features and concepts of the present invention could be properly illustrated.

As discussed above, it is desirable to reduce the number of channels required to send Digital Visual Interface and/or High-Definition Multimedia Interface data. By reducing the number of channels, the number of fibers, detectors, lasers, and supporting integrated circuits will also be reduced, thus providing a much more cost effective solution without negatively impacting image or data quality.

Figure 3:
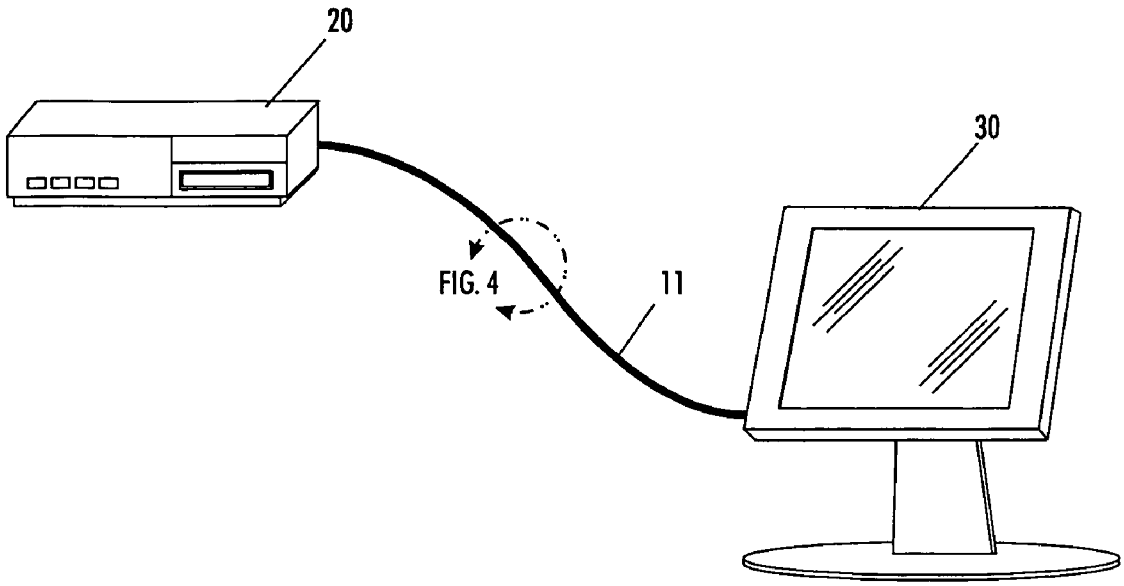
FIG. 3 illustrates a digital video data source/display system according to the concepts of the present invention.
Figure 4:
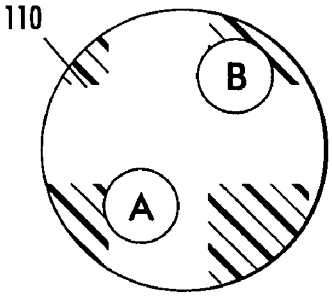
FIG. 4 illustrates a communication cable, used in FIG. 3, for carrying digital video data according to the concepts of the present invention.

An example of such a system is illustrated in FIG. 3. As illustrated in FIG. 3, a digital video source 20 is optically connected to a display device 30 through an optical cable 11. This system does not require numerous lasers, detectors, and fibers to establish a link between the source 20 and display 30 because, as illustrated in FIG. 4, the system of FIG. 3 requires only a single channel (A) for graphic data and a single channel (B) for the clock, upstream control data, and downstream control data. This can be done by designing a different configuration protocol, as will be discussed in more detail below.

To reduce the number of Digital Visual Interface and/or High-Definition Multimedia Interface channels, extra bandwidth in the graphic data stream is utilized, and the various rates of Digital Visual Interface and/or High-Definition Multimedia Interface resolutions are converted to a fixed data rate.

In a preferred embodiment, the fixed data rate may be at a higher rate than the highest Digital Visual Interface and/or High-Definition Multimedia Interface resolution. By establishing a fixed data rate at rate higher than the highest Digital Visual Interface and/or High-Definition Multimedia Interface resolution, multiple channels can be converted to a single downstream channel and a single upstream channel.

Video Electronics Standards Association (VESA) is a standards body that sets video and graphic resolutions standards. The VESA standards are used as the input and output formats for Digital Visual Interface and/or High-Definition Multimedia Interface transmitters and receivers. VESA standards also define the amount of data active time and the amount of blanking time (non data periods). The specification breaks down the display data into line (one row of display data) and frame timing (the time between the first row of data until that row receives new data). A graphical illustration of the specification is shown in FIGS. 5 and 6 wherein FIG. 5 shows line and frame timing for digital display data and FIG. 6 is a magnified illustration of the graphic data signal of FIG. 5.

Figure 5:
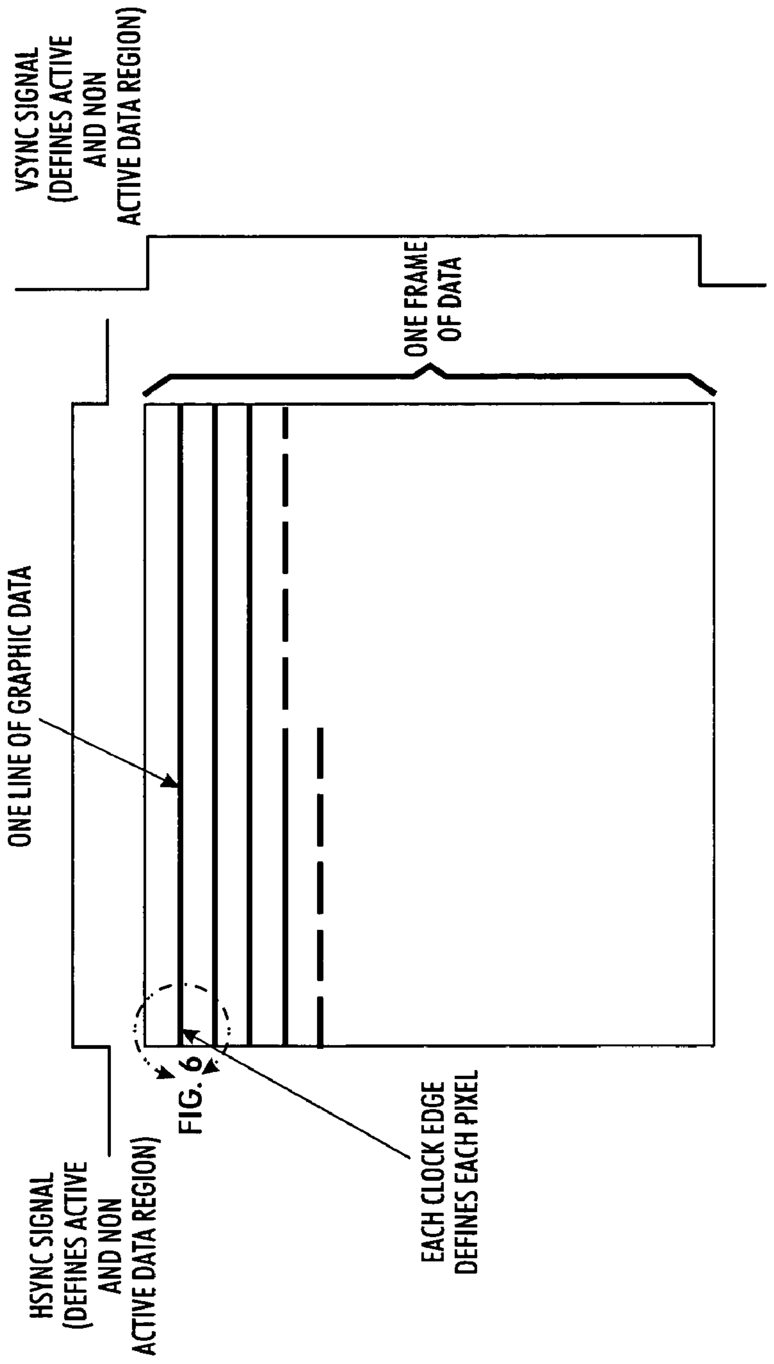
FIG. 5 is an illustration of line and frame timing for digital display data according to the concepts of the present invention.
Figure 6:
FIG. 6 is a magnified illustration of the graphic data signal of FIG. 5.
Figure 7:
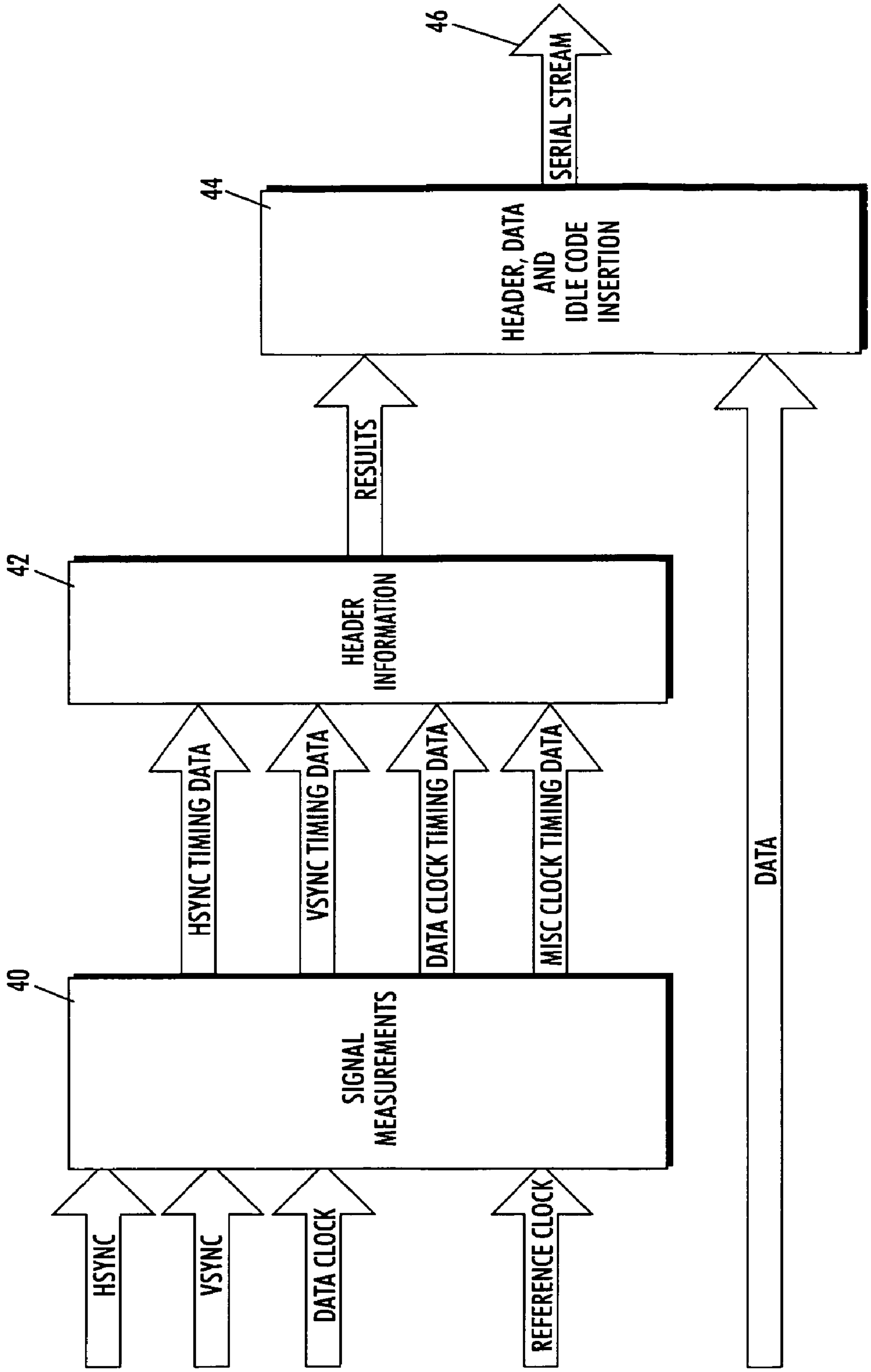
FIG. 7 is a block diagram showing the protocol for producing timing information according to the concepts of the present invention.

As illustrated in FIG. 5, there is blanking time before and after the active display data. There is also, as illustrated in FIG. 5, blanking time before and after the very last row of display data. The next row of data will start again at the top of the screen indicating the next video/graphics frame. To achieve the conversion of multiple channels to a single downstream channel and a single upstream channel, a system as illustrated in FIG. 7, initially takes measurements on the data going into the system (40) and produces timing information for inclusion in the header information (42). The header information is multiplexed with graphic data and idle codes (44) to produce a serial stream of data. In this system, idle codes are sent when graphic data or header data is not available to send. The sending of idle codes when graphic data or header data is not available to send enables the fixed rate data stream to continue to send information so as to keep the receiver locked. In other words, when very slow input data rates are used idle codes are sent to maintain a constant data stream.

Figure 8:
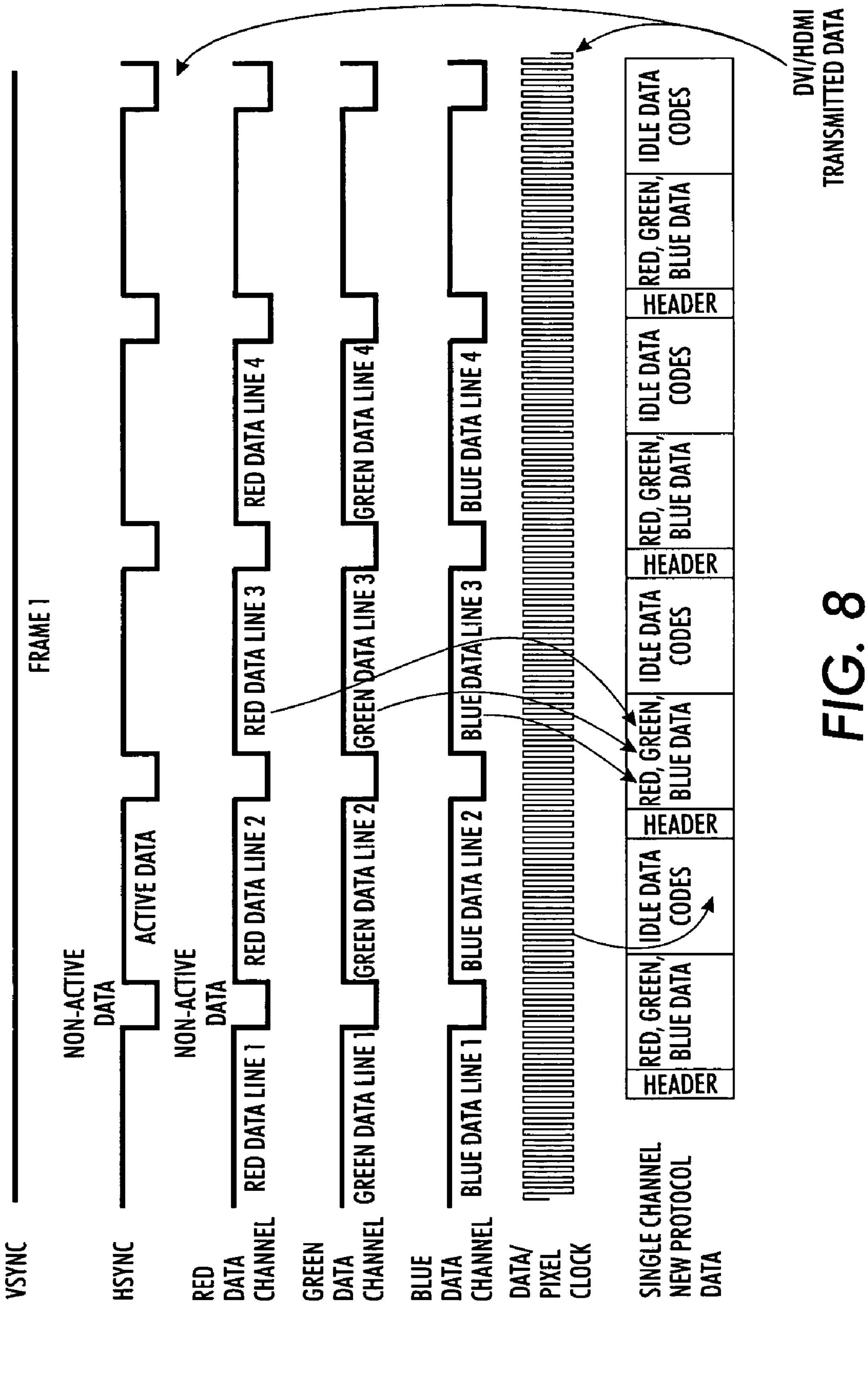
FIG. 8 shows the architecture of a single data stream generated from three data streams according to the concepts of the present invention.

FIG. 8 shows the architecture of the data that takes three different data lines (plus control data) and puts them into a single data stream. The data in the serial stream is encoded to make data extraction at the receiver possible without the use of a separate clock signal at the fixed rate frequency. More specifically, the receiver at the other end reads the header information and then recreates the necessary timing information as well as extracts the data back into the correct resolution format.

As discussed above and illustrated in FIG. 8, timing information, produced from the $V_{SYNC}$, $H_{SYNC}$, $Data_{CLOCK}$, and $Pixel_{CLOCK}$ signals, is placed in the header of each packet of data. The graphic data from the various data channels (RED, GREEN, and BLUE) is encoded and multiplexed so as to follow the header information. If necessary, idle codes are sent when graphic data or header data is not available to send so as to keep the receiver locked. As noted above, FIG. 9 is a block diagram illustrating a fixed rate optical extender for a digital video interface according to the concepts of the present invention.

Figure 9:
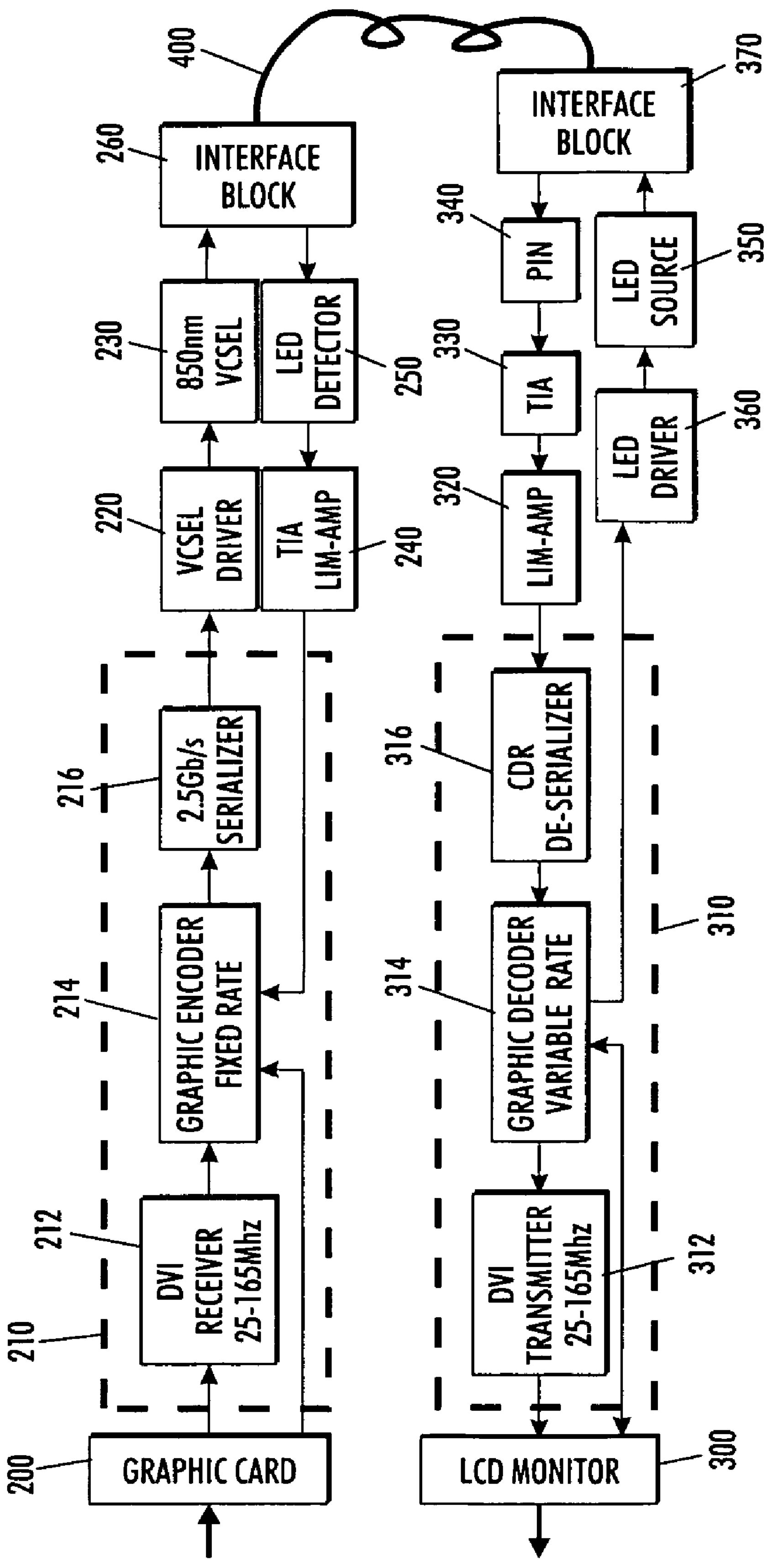
FIG. 9 is a block diagram illustrating a fixed rate optical extender for a digital video interface according to the concepts of the present invention.

As illustrated in FIG. 9, graphic data and timing signals are fed from a graphic card 200 to a variable rate to fixed rate digital visual and/or high-definition multimedia conversion component 210. The variable rate to fixed rate digital visual and/or high-definition multimedia conversion component 210 includes a Digital Visual Interface and/or High-Definition Multimedia Interface receiver 212. The Digital Visual Interface and/or High-Definition Multimedia Interface receiver 212 measures the various timing signals to generate timing information wherein the timing information is fed to a graphic encoder fixed rate circuit 214. The graphic encoder fixed rate circuit 214 also receives graphic data from the graphic card 200.

The graphic encoder fixed rate circuit 214 produces the header information from the timing information and encodes the multiple channels of graphic data; e.g., red, green and blue channels of data. The graphic encoder fixed rate circuit 214 further transmits the header information with the graphic data and the appropriate idle codes, when necessary, to the serializer 216. The serializer 216 multiplexes information to create a serial data stream having a fixed data rate.

The serial data stream having a fixed data rate is converted to a stream of lights pulses by VCSEL Driver 220 and VCSEL 230. The light pulses are fed to an interface block 260 to be transmitted over an optical fiber in cable 400 so as to be eventually displayed on a display device 300.

At the display device end, an interface block 370 receives the light pulses from the optical fiber in cable 400. The light pulses are converted to electrical signals by PIN 340, TIA 330, and limited amplifier 320. The fixed data rate electrical data stream is de-serialized by de-serializer 316. The deserialized data is decoded by graphic decoder fixed rate circuit 314 to produce graphic data and timing information. The timing information is converted into timing signals by a Digital Visual Interface and/or High-Definition Multimedia Interface transmitter 312. The timing signals and the decoded graphic data are fed to a display device 300 for proper displaying of the image or information.

Control data from the monitor 300 is fed to graphic decoder fixed rate circuit 314 so as to be transmitted to the data source. The control data is converted to a stream of lights pulses by LED Driver 320 and LED source 330. The light pulses associated with the control data are fed to interface block 370 to be transmitted over an optical fiber in cable 400 so as to be eventually used by the graphic encoder fixed rate circuit 214. The light pulses associated with the control data are converted to electrical signals by LED detector 250 and TIA 240.

Figure 10:
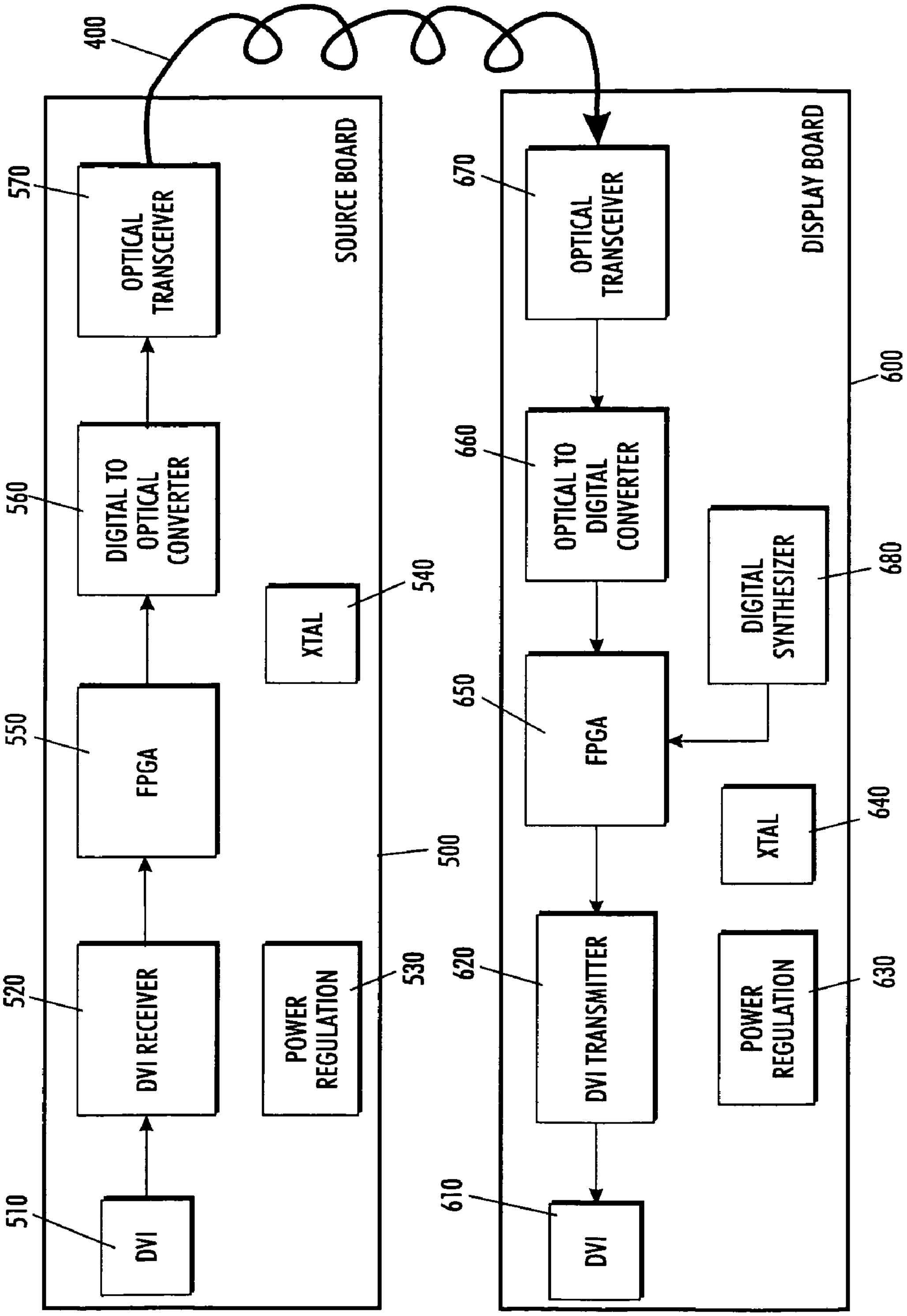
FIG. 10 is a block diagram illustrating a second fixed rate optical extender for a digital video interface according to the concepts of the present invention.

FIG. 10 is another block diagram illustrating a fixed rate optical extender for a digital video interface according to the concepts of the present invention. As illustrated in FIG. 10, a Digital Visual Interface and/or High-Definition Multimedia Interface 510 generates graphic data and timing information to be fed to a Digital Visual Interface and/or High-Definition Multimedia Interface receiver 520. The Digital Visual Interface and/or High-Definition Multimedia Interface receiver 520 measures the various timing signals to generate timing information wherein the timing information is fed to a programmable gate array 550.

The programmable gate array 550 produces the header information from the timing information and encodes the multiple channels of graphic data; e.g., red, green and blue channels of data. The programmable gate array 550 further transmits the header information with the graphic data and the appropriate idle codes, when necessary, to a digital to optical converter 560. The digital to optical converter 560 converts the data to a stream of lights pulses. The light pulses are fed to an optical transceiver 570 to be transmitted over an optical fiber in cable 400.

At the display device end, an optical transceiver 670 receives the light pulses from the optical fiber in cable 400. The light pulses are converted to electrical signals by optical to digital converter 660. The fixed data rate electrical data stream is decoded by programmable gate array 650 to produce graphic data and timing information. The timing information is converted into timing signals by a Digital Visual Interface and/or High-Definition Multimedia Interface transmitter 620. The timing signals and the decoded graphic data are fed to a Digital Visual Interface and/or High-Definition Multimedia Interface 610.

As noted above, with respect to a conventional Digital Visual Interface and/or High-Definition Multimedia Interface system, the data transfer system sends data back and forth from point A to point B; however, the data transfer system does not send the same amount of data in one direction as in the other direction. More specifically, in the conventional system, Point A could be sending data at 2 Gb/s to point B, but Point B is only sending 1 Mb/s of data to Point A. Typically, this type of system would require two fiber channels, one for the high speed downstream data and one for low speed upstream data, or a single mode system that creates bi-directional data stream with two different wavelengths, which adds additional circuitry.

Figure 11:
FIG. 11 is a graphical illustration of an optical communication system according to the concepts of the present invention.
Figure 12:
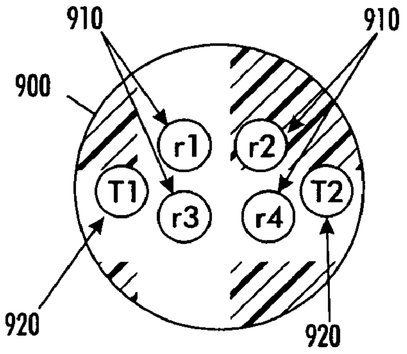
FIG. 12 illustrates a digital video data communication cable according to the concepts of the present invention.

To avoid the above-noted problems, as illustrated in FIG. 11, a solution may be to use an optical fiber to send the high rate data to Point B from Point A, but use an electrical signal caring medium for the data transfer from Point B to Point A. For example, as illustrated in FIG. 12, a fiber assembly may contain both optical fibers (r1, r2, r3, and r4) for high data rate signals and a tension member(s) (T1 and T2) that are designed with a low resistance material. The tension member(s) (T1 and T2) can be used to carry the lower data rate electrical signals.

Figure 13:
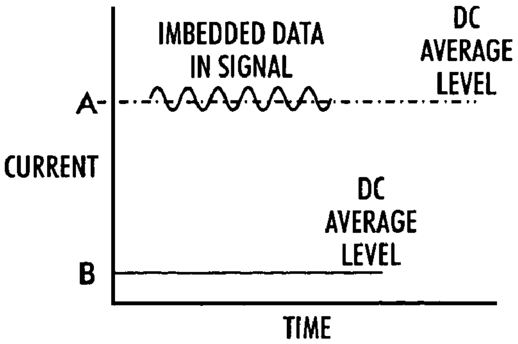
FIG. 13 shows a graphical illustration of the transmission of digital video data using current modulation according to the concepts of the present invention.

There are various ways that the electrical signal could be constructed on the tension member(s) (T1 and T2). The tension member(s) (T1 and T2) may carry DC signals such as power and ground, a combination of both the DC level and a AC component could be used to supply power. As illustrated in FIG. 13, a low frequency modulation may be imbedded upon these signals so as to supply low data rate information.

Figure 14:
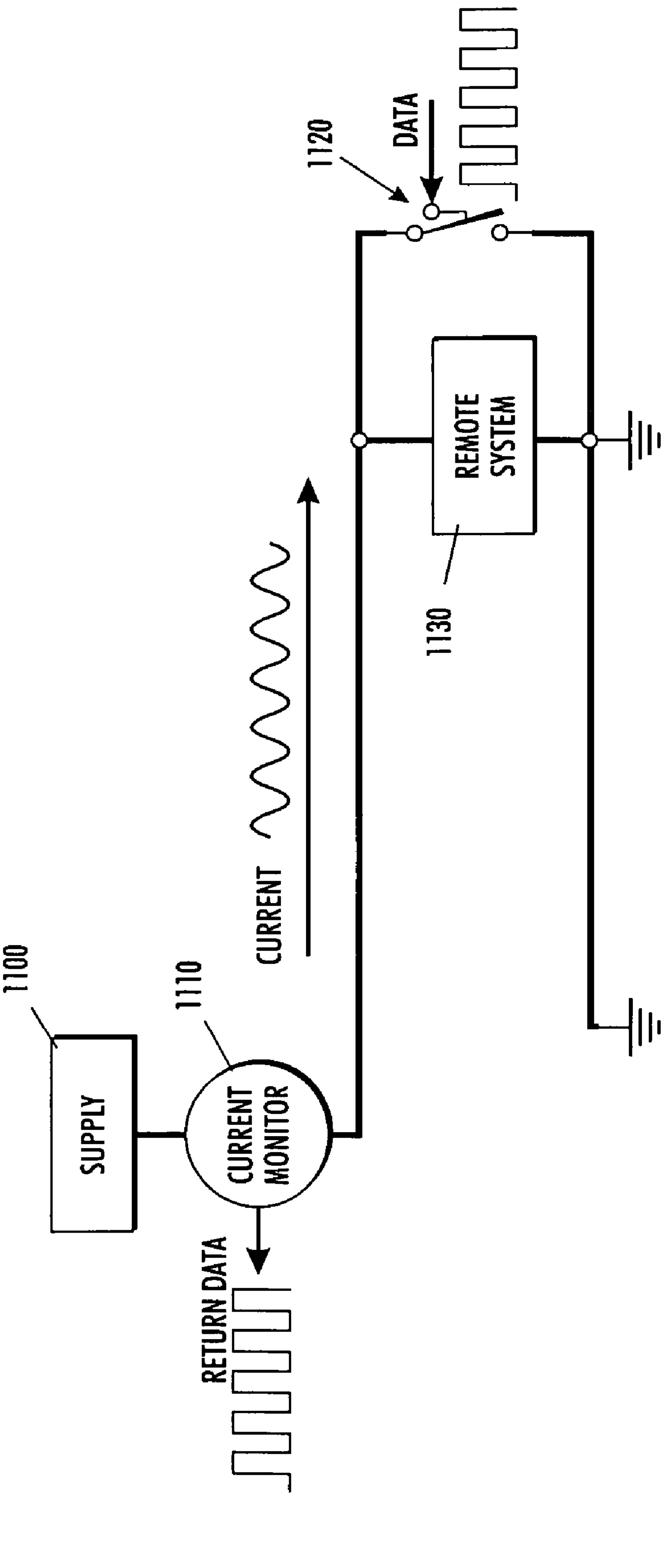
FIG. 14 shows a block diagram of the transmission of digital video data using current modulation according to the concepts of the present invention.

Another example may utilize current modulation as illustrated in FIG. 14. In FIG. 14, a current from a supply 1100 is fed through a current monitor 1110 prior to being sent over the tension member(s) (Ti and T2). At the other end, in parallel to a remote system 1130, a current modulator 1120 modulates the current in response to received data. The current modulator 1120 causes the modulation to be reflected back at the current monitor 1110 so that the data corresponding to the modulation can be captured.

In the various solutions discussed above, it is desirable to transmit the data at a fixed data rate. The transfer of data at a fixed rate requires a circuit that will convert the variable rate data to a fixed rate. To convert from one data rate to another rate, some type of memory device is also needed. This allows data to be written into memory element at one rate then read out later at another rate. For example, a FIFO (first in-first out) type of memory element can be used.

Figure 15:
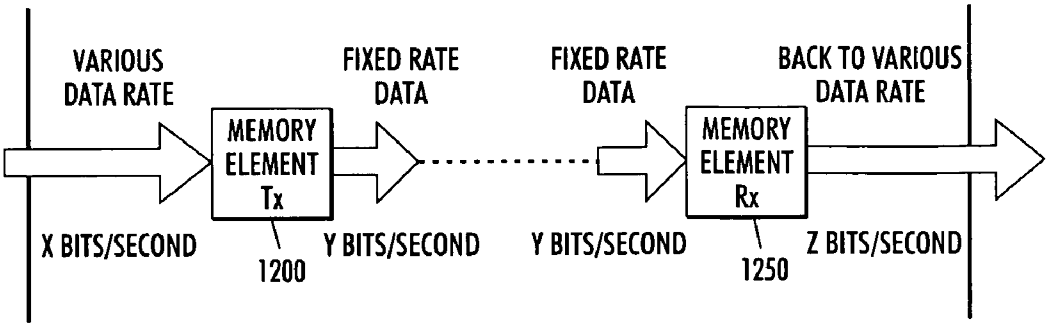
FIG. 15 is a block diagram of a transmitter/receiver pair for transmitting digital video data at a fixed rate according to the concepts of the present invention.

As illustrated in FIG. 15, a data transmission system has a transmitter circuit at one end and a receiver circuit at the other end. In such a graphic system, the data into the transmitter can be at various rates based upon the users' requirements and the display's capabilities. The graphic resolution being used will determine the display system's pixel clock frequency. The transmitter converts, using a memory element 1200, the variable rate input to a fixed rate. The fixed rate data is sent across some type of medium or channel to a receiver at the other end. The receiver receives the fixed rate data and stores the data into a memory element 1250. The data will need to be read out of the memory element 1250 at the same rate as data was read into the memory element 1200 of the transmitter at the other end of the link.

However, the actual pixel clock from the transmitter is not sent along with the fixed rate data. The pixel clock at the receiver is not recreated. The pixel clock at the receiver has to match the transmitter's pixel clock or over time the memory may over-fill or under-fill the memory element 1250.

More specifically, as illustrated in FIG. 15, if Z=X, the data entering and leaving the system will be the same. On the other hand, if Z>X, the data leaving the system will be faster than the data entering the system, this will cause memory element 1250 to request more data than is available, thereby creating an under-fill condition. Lastly, if Z<X, the data leaving the system will be slower than the data entering the system, causing memory element 1250 to store excess data, thereby creating, over time, an over-fill condition.

The over-fill or under-fill conditions of the memory element 1250 will cause errors in the displayed image. Either there will not be enough data in memory element 1250 and data will be lost or too much data will be in the memory element 1250 and not all of the image will be displayed. Since the receiver's clock rate will be very close to the transmitter's clock rate, the errors will occur relatively slowly, basically causing the image to scroll.

Another way to avoid the memory storage issue on the receiver would be to transmit a reference clock. Implementing the extra clock signal will create extra noise, use an extra data channel and the fixed rate system is not longer fixed rate. Also, to avoid the memory storage issue it could be required to recreate the pixel clock at the receiver without an extra clock line. In this example, the transmitter is not required to send a separate synchronous clock to the receiver for pixel clock alignment. A general protocol with counters, a clock synchronizer, in a feedback loop are used to determine the correct in pixel frequencies such that it will not cause a memory over-fill or an under-fill condition and create an error free image.

Figure 17:
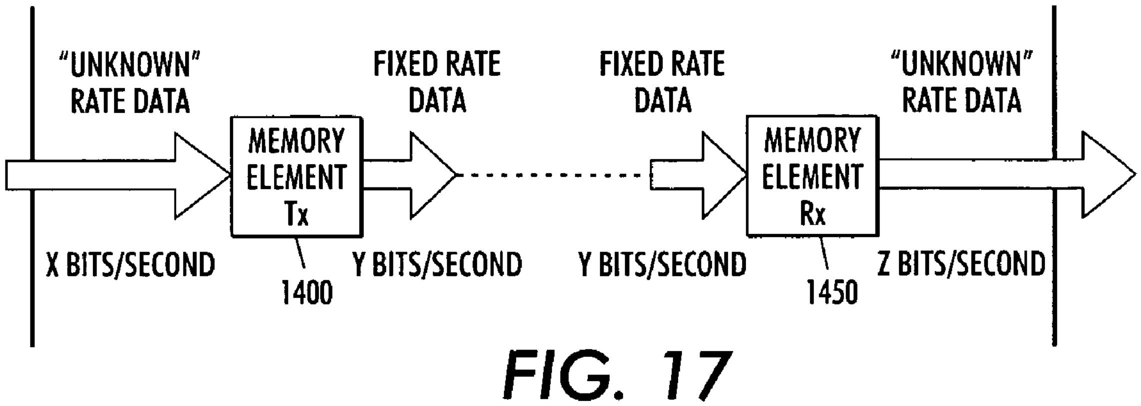
FIG. 17 illustrates a block diagram of another transmitter/receiver pair for transmitting digital video data at a fixed rate according to the concepts of the present invention.

As illustrated in FIG. 17, a data transmission system has a transmitter circuit at one end and a receiver circuit at the other end. In such a graphic system, the data into the transmitter can be at various rates based upon the users' requirements and the display's capabilities. The graphic resolution being used will determine the display system's pixel clock frequency.

The transmitter converts, using a memory element 1400, an unknown rate input to a fixed rate. The fixed rate data is sent across some type of medium or channel to a receiver at the other end. The receiver receives the fixed rate data and stores the data into a memory element 1450. The data will need to be read out of the memory element 1250 at the same unknown rate as data was read into the memory element 1400 of the transmitter at the other end of the link.

However, the actual pixel clock from the transmitter is not sent along with the fixed rate data. The pixel clock at the receiver is not recreated. The pixel clock at the receiver has to match the transmitter's pixel clock or over time the memory may over-fill or under-fill the memory element 1450.

Figure 16:
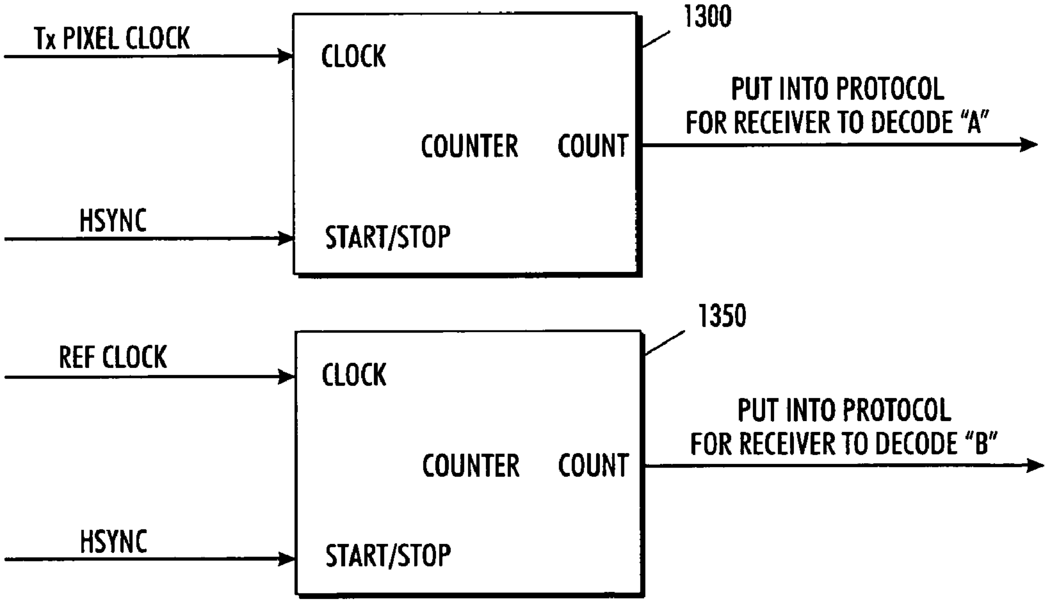
FIG. 16 is a block diagram of the circuitry used to produce the protocol used in transmitting digital video data according to the concepts of the present invention.

At system power-up, the transmitter sends an estimate of the pixel clock frequency. This is done by counting the number of clock transitions in a given amount of time. As illustrated in FIG. 16, a counter 1300 counts the number of pixel clock transitions between horizontal sync signals. A reference clock is also counted during the same. As illustrated in FIG. 16, a counter 1350 counts the number of reference clock transitions between horizontal sync signals. The pixel clock and the reference clock are not synchronous, nor are they integer multiples (they are not derived from the same clock source).

The non-synchronous clock will cause quantization errors in the measurements. This is due to uncertainty of the two clock relationships (at any instant, the rising edge of the sampling clock could be at any various relationship to the measured clock (before, after, or at the same time)). Any time that the two are apart, the actual count is not a whole value, but a percentage. Since the round off is not an integer, a measurement error will occur. The receiver also utilizes a known reference frequency for measurements and clock re-creation. By using the reference clock along with the count value sent by the transmitter, a close approximation of the pixel clock frequency can be obtained.

Figure 18:
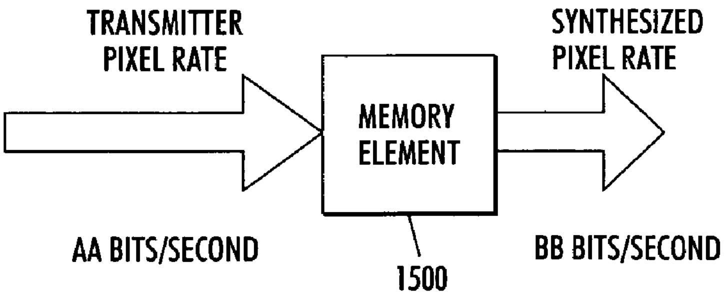
FIG. 18 illustrates the utilization of a memory element to convert the data rate according to the concepts of the present invention.

A digital clock synthesizer is used to re-create the receiver pixel clock frequency based on the percentage information that was sent in the protocol. However, due to errors in the count value and rounding errors during the percentage calculation, the receiver's generated pixel clock frequency will not be exactly the same as the transmitter's pixel clock. The error will cause over and under flow errors in the receiver's memory element 1500 of FIG. 18.

To determine a more accurate pixel clock frequency and avoid the under and overflow conditions, a control circuit is used to monitor the receiver's memory usage. The control system provides information to the digital clock synthesizer to alter the generated pixel clock frequency. A reference point in time is chosen that repeats at a constant interval. This reference point can be used as a guide to indicate the memory usage patterns.

In this example, the horizontal frequency is used as a reference point. At each rising edge of the horizontal line signal, the amount of memory being used is stored. The measurement is done again on the next horizontal line signal edge. The location of the second measurement is compared to the first measurement.

If the memory usage is increasing, the generated pixel clock is too slow and the digital synthesizer needs to increase the frequency. If the memory usage is decreasing, the digital clock synthesizer needs to reduce a frequency. This measurement feedback loop is in constant operation; mainly due to the fact the digital synthesizer can never recreate the same frequency as the transmitter. Over time, the receiver's pixel clock is at two different frequencies that are just above and below the actual transmitted clock frequency. The average of the two values will be the same frequency as determined transmitter's pixel clock.

Figure 19:
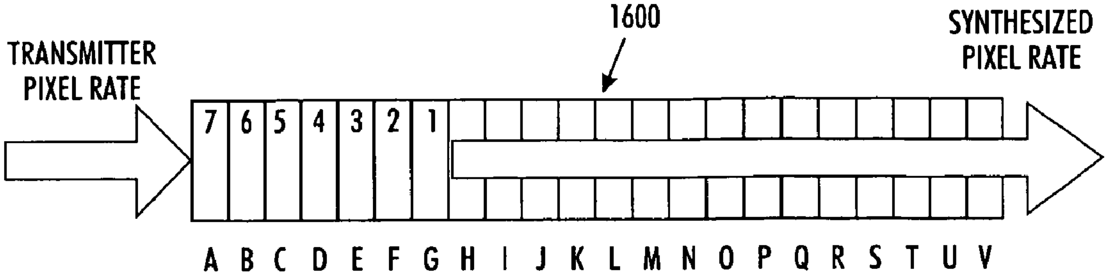
FIGS. 19 and 20 illustrate memory storage conditions at a certain period of time.
Figure 20:
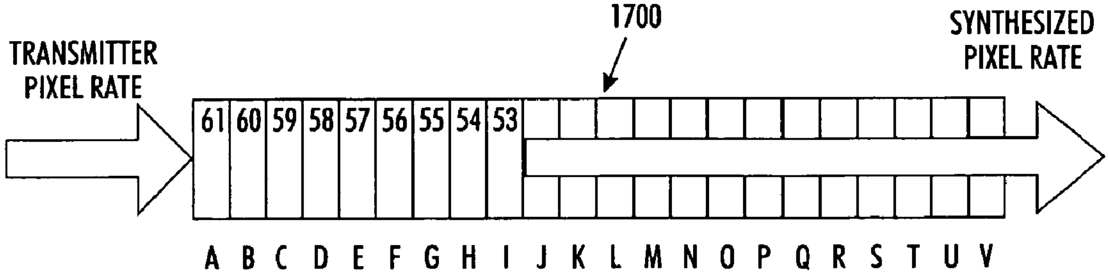

In the display example, the comparison is done once per line. If the amount of memory used in the memory element has changed with respect to the previous time as illustrated in FIGS. 19 and 20 wherein FIG. 20 illustrates an increase in usage since a previous time represented by FIG. 19, the previous horizontal line signal measurement, information is sent to the digital synthesizer to either increase or decrease in synthesized frequency to more accurately match the transmitter's pixel clock. The system will assume that the digital synthesizer's pixel clock generation will never exactly match the transmitter's pixel clock. To overcome this problem, the pixel clock will operate between two frequencies, one just below the ideal frequency and one just above the ideal frequency. Over time, the average value will be the same frequency as a transmitter's pixel clock.

At system power-up, the two frequencies of operations will have a relatively large difference. As a system operates, the difference between the two frequencies will be reduce. This will continue until the difference is below any errors that may occur by operating at one frequency at extended lengths of time. For system robustness over environmental all changes, additional monitors can be used to re-adjust the two frequencies if needed.

Figure 21:
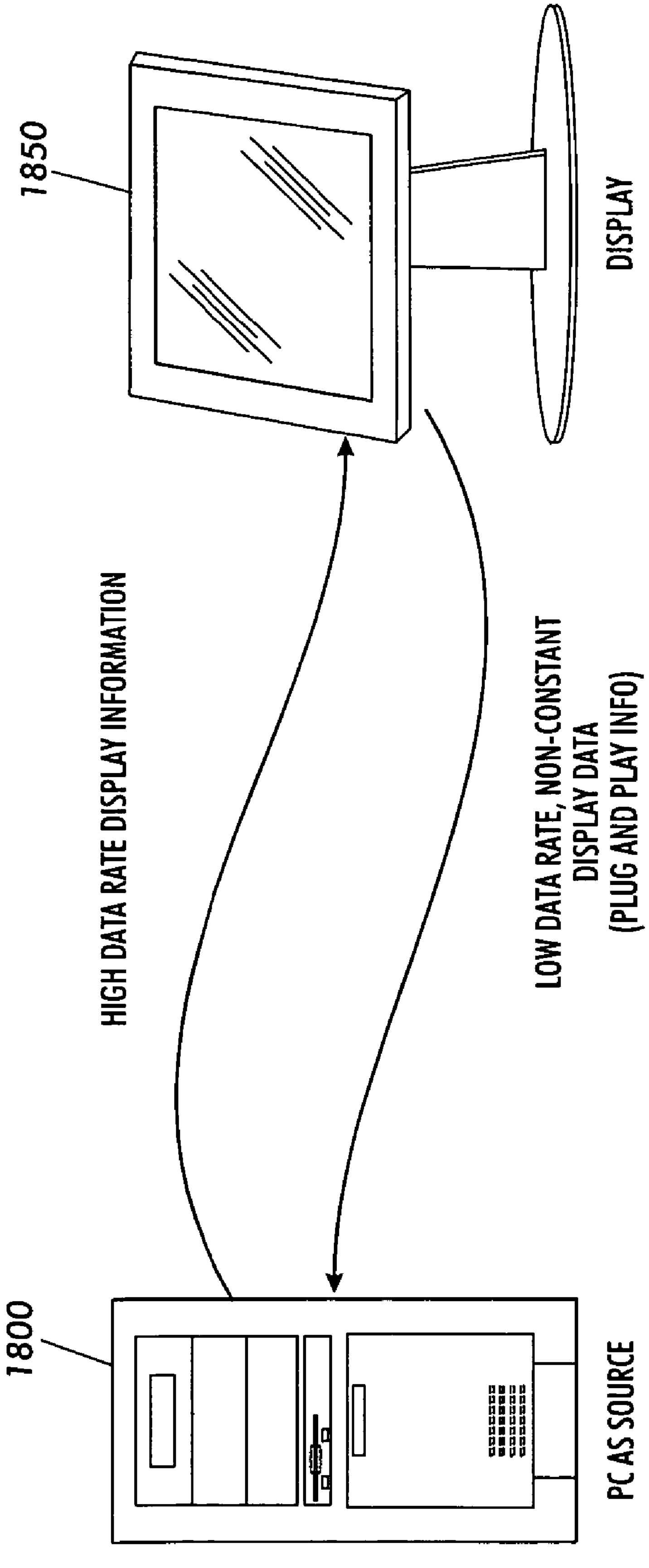
FIG. 21 illustrates a transmitter/receiver system between a data source and a display according to the concepts of the present invention.

As noted above, Digital Visual Interface and/or High-Definition Multimedia Interface are graphic protocols that send graphic data and control data from a source 1800 of FIG. 21 to a display 1850 of FIG. 21. Control information is also sent from the display to the source 1800. The graphic information is at high data rate, while the control information is at low data rate. Since control data is flowing in both directions, the system requires some type of bi-directional link. Since the return control data is not constant, when control data is being sent, the data rate is slow relative to the graphic data from the source to the display. The return control data is only active a very small percentage of the time relative to the downstream graphic data.

Figure 22:
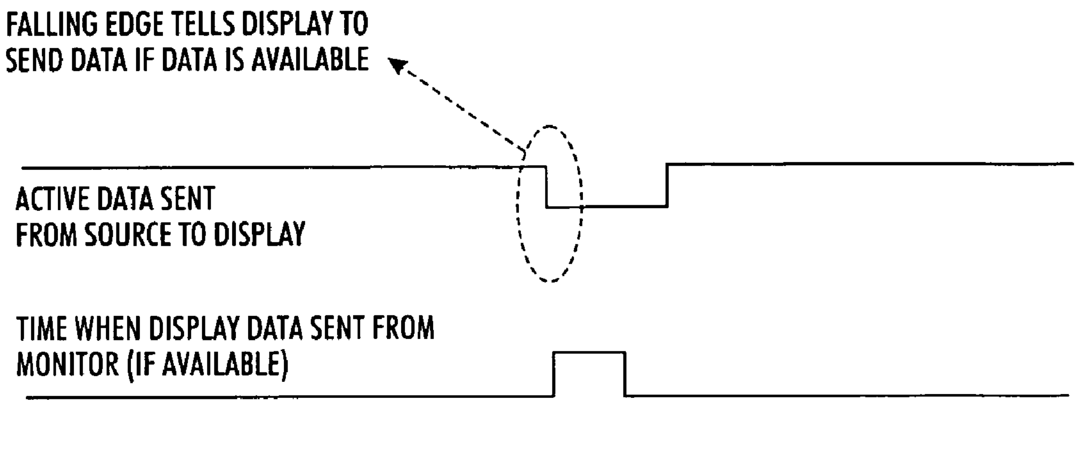
FIG. 22 is a graphical illustration of a communication process between a data source and a display according to the concepts of the present invention.
Figure 23:
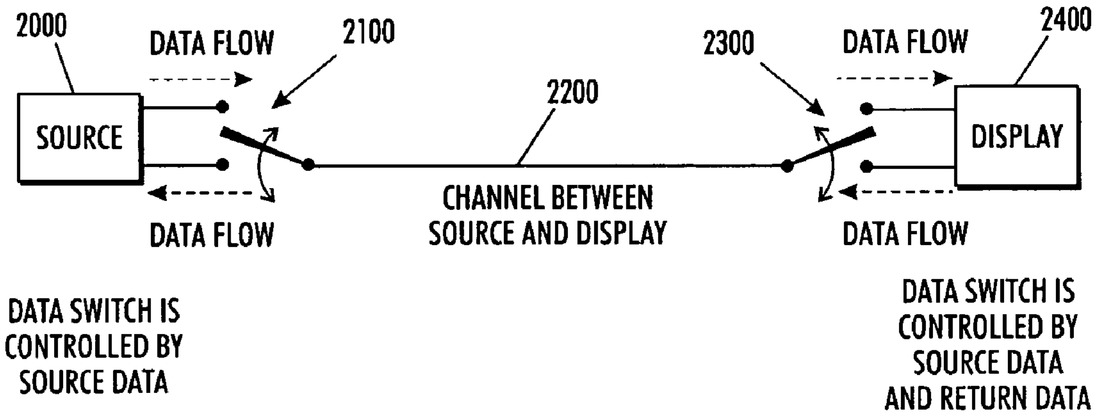
FIG. 23 is a block diagram of the communication process of FIG. 22 according to the concepts of the present invention.

One approach to creating such a bi-directional link is illustrated in FIGS. 22 and 23. This approach takes advantage of how the Digital Visual Interface and/or High-Definition Multimedia Interface protocol is defined. Since Digital Visual Interface and/or High-Definition Multimedia Interface is a graphic interface, it has data periods as well as non-data periods. The non-data periods are at the end of each line of data, prior to the next horizontal sync signal. There is also non-data time after all of the lines have been sent to the display, prior to the next vertical sync signal.

The approach provides bi-directional data without requiring two separate channels by applying time multiplexing between the source and display. The source to display transmission can be stopped when display data or control data is not being sent, then information from the display to the source can be sent using the switching architecture illustrated in FIG. 23.

As illustrated in FIG. 23, a source 2000 prepares graphic data and timing information to be sent to a display 2400. When the source 2000 is sending graphic data and timing information to be sent to the display 2400 over communication channel 2200, switching circuit 2100 is configured so that data flows from the source 2000 to the display 2400. Moreover, switching circuit 2300 is configured so that data flows from the source 2000 to the display 2400 when the source 2000 is sending graphic data and timing information to be sent to the display 2400 over communication channel 2200.

On the other hand, when the source 2000 is not sending graphic data and timing information to be sent to the display 2400 over communication channel 2200, switching circuit 2100 is configured so that data flows to the source 2000 from the display 2400. Moreover, switching circuit 2300 is configured so that data flows to the source 2000 from the display 2400 when the source 2000 is not sending graphic data and timing information to be sent to the display 2400 over communication channel 2200.

Figure 24:
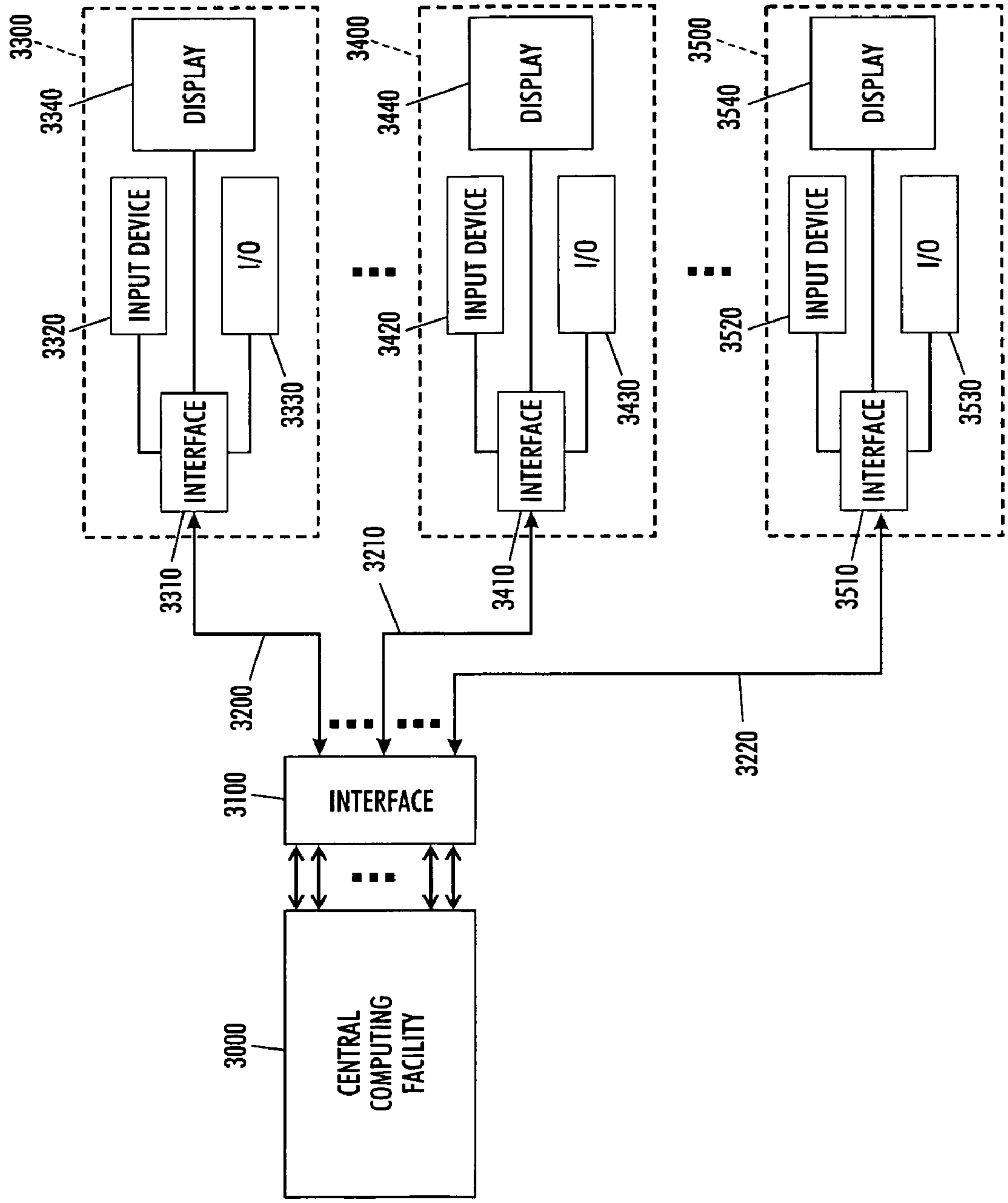
FIG. 24 is a block diagram illustrating the utilization of the concepts of the present invention in a remote workstation environment.

It is noted that the various embodiments described above can be utilized in a remote workstation/central processing environment as illustrated in FIG. 24. In this environment, as illustrated in FIG. 24, a central computing facility or room 3000 contains all of the primary processing capability for each user in the form of "Blade PCs." A Blade PC is the primary processing center for a user of the system such that each user is assigned and connected to an individual Blade PC. In other words, the Blade PC would be equivalent to the user's actual personal computer in a distributive system.

The remote workstation/central processing environment enables the primary processing facility to be located in a temperature controlled environment. Moreover, the remote workstation/central processing environment enables the elimination of individual PC cases, allows for a common power supply, and reduces the machine noise in the user's environment.

As further illustrated in FIG. 24, each user has, at their station or desk (3300, 3400, or 3500), a monitor (3340, 3440, or 3540); an input device (3320, 3420, or 3520) such as a keyboard, pointing device (mouse, digital pad, and/or light pen) and/or microphone, etc.; and/or an input and/or output device (3330, 3430, or 3530), such as a storage device (CD R/W Drive, DVD R/W Drive, floppy drive, and/or removable memory device), speakers, docketing station, and/or digital imager, etc. Each station also includes an interface (3310, 3410, or 3510) that provides a bridge between the station's devices and the associated optical communication link (3200, 3210, or 3220).

The various communication links are connected to an interface 3100 at the central computing facility 3000 so that each Blade PC has an optical communication link to an associated station. The optical communication links (3200, 3210, or 3220) carry not only graphical data from the Blade PC to the associated station, but also carries all the data between the Blade PC and the various associated station devices; i.e., data generated by a keyboard or a mouse. This communication of data may be bi-directional.

To facilitate proper communication between the central computing facility 3000 and each station (3300, 3400, or 3500), the interfaces (3310, 3410, or 3510) would include the various components, as described above, that facilitate optical to electrical and electrical to optical conversions. More specifically, in one possible embodiment of the present invention, the interface 3100 would measure the various timing signals to generate timing information wherein the timing information is fed to a programmable gate array.

The programmable gate array produces the header information from the timing information and encodes the multiple channels of graphic data; e.g., red, green and blue channels of data. The programmable gate array further transmits the header information with the graphic data and the appropriate idle codes, when necessary, to a digital to optical converter. The digital to optical converter converts the data to a stream of lights pulses. The light pulses are fed to an optical transceiver to be transmitted over one of the optical communication links (3200, 3210, or 3220) which transmits the data to the appropriate station (3300, 3400, or 3500).

At the station end, the interfaces (3310, 3410, or 3510) would include an optical transceiver that receives the light pulses from the optical communication links (3200, 3210, or 3220). The light pulses are converted to electrical signals by optical to digital converter. The fixed data rate electrical data stream is decoded by programmable gate array to produce graphic data and timing information. The timing information is converted into timing signals. The timing signals and the decoded graphic data are fed to the monitor or display device (3340, 3440, or 3540).

As noted above, the system sends data back and forth from point A to point B; however, the system does not send the same amount of data in one direction as in the other direction. More specifically, in the conventional system; Point A could be sending data at 2 Gb/s to point B, but Point B is only sending 1 Mb/s of data to Point A. Typically, this type of system would require two fiber channels, one for the high speed downstream data and one for low speed upstream data, or a single mode system that creates bi-directional data stream with two different wavelengths, which adds additional circuitry.

To avoid the above-noted problems, as noted above, a solution may be to use an optical fiber to send the high rate data to Point B from Point A, but use an electrical signal caring medium for the data transfer from Point B to Point A. For example, a fiber assembly may contain both optical fibers for high data rate signals and a tension member(s) that are designed with a low resistance material. The tension member (s) can be used to carry the lower data rate electrical signals.

There are various ways that the electrical signal could be constructed on the tension member(s). The tension member (s) may carry DC signals such as power and ground, a combination of both the DC level and an AC component could be used to supply power. A low frequency modulation may be imbedded upon these signals so as to supply low data rate information. Another example may utilize current modulation as discussed above.

It is noted that any data from the display to the source can be held in memory until one of the idle times is present. Then the return data can be sent on the same channel. It is also noted that various other techniques at each end of the channel can be developed to handle both the transmission and receiving of data at each termination point.

While various examples and embodiments of the present invention have been shown and described, it will be appreciated by those skilled in the art that the spirit and scope of the present invention are not limited to the specific description and drawings herein, but extend to various modifications and changes.

What is claimed is:

1. A method for transmitting varying frequency dependent data, comprising:

(a) receiving frequency dependent data, horizontal sync signals associated with the frequency dependent data, and a frequency dependent data clock signal, the frequency dependent data clock signal being associated with the frequency dependent data;

(b) converting the frequency dependent data to frequency independent data;

(c) determining a frequency dependent data clock number, the frequency dependent data clock number being a number of clock cycles of the frequency dependent data clock signal between two horizontal sync signals, and a reference clock number, the reference clock number being a number of clock cycles of a reference data clock signal between two horizontal sync signals;

(d) determining a ratio of the frequency dependent data clock number to the reference clock number;

(e) transmitting the determined ratio;

(f) transmitting, at a fixed rate, the frequency independent data and header data to a receiver, the fixed rate being a frequency greater than the frequency of the frequency dependent data clock signal;

(g) receiving the frequency independent data and the determined ratio;

(h) converting the frequency independent data to frequency dependent data based upon the received determined ratio; and (i) adjusting a frequency of the converted frequency dependent data based on an amount of a memory usage, wherein the frequency adjustment of the converted frequency dependent data is based on a comparison of a first amount of memory usage in a first cycle of the horizontal sync signals with a second amount of memory usage in a second cycle of the horizontal sync signals.

2. The method as claimed in claim 1, further comprising:

(j) transmitting idle codes to the receiver when the frequency independent data is unavailable to be transmitted so as to maintain transmission of a constant data stream to the receiver.

3. The method as claimed in claim 1, further comprising:

(j) transmitting idle codes to the receiver when the header data is unavailable to be transmitted so as to maintain transmission of a constant data stream to the receiver.

4. The method as claimed in claim 1, further comprising:

(j) transmitting idle codes to the receiver when the header data and the frequency independent data are unavailable to be transmitted so as to maintain transmission of a constant data stream to the receiver.

5. A method for transmitting varying frequency dependent data, comprising:

(a) receiving frequency dependent data having a pre-determined resolution format associated therewith, horizontal sync signals associated with the frequency dependent data, and a frequency dependent data clock signal associated with the frequency dependent data;

(b) determining timing information from the received frequency dependent data, the timing information being a ratio of a number of clock cycles of the frequency dependent data clock signal between two horizontal sync signals to a number of clock cycles of a reference data clock signal between two horizontal sync signals;

(c) converting the received frequency dependent data to frequency independent data;

(d) encoding the frequency independent data with the timing information determined from the received frequency dependent data;

(e) transmitting, at a fixed rate, the timing information encoded frequency independent data to a receiver;

(f) receiving the timing information encoded frequency independent data;

(g) extracting timing information from the timing information encoded frequency independent data;

(h) re-creating, based upon the extracted timing information, frequency dependent data having the pre-determined resolution associated therewith; and (i) adjusting a frequency of the re-created frequency dependent data based on an amount of a memory usage, wherein the frequency adjustment of the re-created frequency dependent data is based on a comparison of a first amount of memory usage in a first cycle of the horizontal sync signals with a second amount of memory usage in a second cycle of the horizontal sync signals.

6. The method as claimed in claim 5, further comprising:

(j) transmitting idle codes to the receiver when the timing information encoded frequency independent data is unavailable to be transmitted so as to maintain transmission of a constant data stream to the receiver.

7. A component for transmitting graphical data generated by a graphical data source to a display device, comprising:

a circuit to receive frequency dependent data, horizontal sync signals associated with the frequency dependent data, and a frequency dependent data clock signal associated with the frequency dependent data from the graphical data source, the frequency dependent data having a resolution format and a data clock frequency associated therewith, and to generate timing information encoded frequency independent data therefrom, said timing information encoded frequency independent data including timing information, said timing information being a ratio of a number of clock cycles of the frequency dependent data clock signal between two horizontal sync signals to a number of clock cycles of a reference data clock signal between two horizontal sync signals;

a transmitter to transmit said timing information encoded frequency independent data at a fixed rate to the display device; and a control circuit to adjust a frequency of the received frequency dependent data based on an amount of a memory usage, wherein the frequency adjustment of the received frequency dependent data is based on a comparison of a first amount of memory usage in a first cycle of the horizontal sync signals with a second amount of memory usage in a second cycle of the horizontal sync signals.

8. The component as claimed in claim 7, wherein said transmitter transmits idle codes to the display device when the timing information encoded frequency independent data is unavailable to be transmitted so as to maintain transmission of a constant data stream to the display device.

9. The component as claimed in claim 7, wherein the received frequency dependent data has a predetermined resolution format.

10. A system for transmitting graphical data generated by a graphical data source to a display device, comprising:

a communication channel;

a first circuit to receive frequency dependent data, horizontal sync signals associated with the frequency dependent data, and a frequency dependent data clock signal associated with the frequency dependent data from the graphical data source, the frequency dependent data having a resolution format and a data clock frequency associated therewith, and to generate timing information encoded frequency independent data therefrom, said timing information encoded frequency independent data including timing information, said timing information being a ratio of a number of clock cycles of the frequency dependent data clock signal between two horizontal sync signals to a number of clock cycles of a reference data clock signal between two horizontal sync signals;

a first transmitter, operatively connected to said communication channel, to transmit said timing information encoded frequency independent data at a fixed rate;

a second circuit, operatively connected to said communication channel, to receive the timing information encoded frequency independent data;

a third circuit, operatively connected to said second circuit, to extract timing information from the timing information encoded frequency independent data and to re-create, based upon the extracted timing information, frequency dependent data having the pre-determined resolution associated therewith, wherein a frequency of the re-created frequency dependent data is adjusted based on an amount of a memory usage; and a second transmitter, operatively connected to said third circuit, to transmit the frequency dependent data having the pre-determined resolution associated therewith to a display device, wherein the frequency adjustment of the re-created frequency dependent data is based on a comparison of a first amount of memory usage in a first cycle of the horizontal sync signals with a second amount of memory usage in a second cycle of the horizontal sync signals.

11. The system as claimed in claim 10, wherein said communication channel is an optical fiber and said first transmitter optically transmits the timing information encoded frequency independent data at a fixed rate.

12. The system as claimed in claim 10, wherein said first transmitter transmits idle codes when the timing information encoded frequency independent data is unavailable to be transmitted so as to maintain transmission of a constant data stream.

13. The system as claimed in claim 10, wherein the received frequency dependent data has a predetermined resolution format.

14. A method for transmitting varying frequency dependent data, comprising:

(a) receiving frequency dependent data, horizontal sync signals associated with the frequency dependent data, and a frequency dependent data clock signal associated with the frequency dependent data;

(b) converting the frequency dependent data to frequency independent data;

(c) determining a frequency dependent data clock number, the frequency dependent data clock number being a number of clock cycles of the frequency dependent data clock signal between two horizontal sync signals, and a reference clock number, the reference clock number being a number of clock cycles of a reference data clock signal between two horizontal sync signals (d) determining a ratio of the frequency dependent data clock number to the reference clock number;

(e) transmitting the determined ratio;

(f) transmitting, at a fixed rate, frequency independent data and header data to a receiver, the fixed rate being a frequency less than the frequency of the associated data clock signal;

(g) receiving the frequency independent data and the determined ratio;

(h) converting the frequency independent data to frequency dependent data based upon the received determined ratio; and (i) adjusting a frequency of the converted frequency dependent data based on an amount of a memory usage, wherein the frequency adjustment of the converted frequency dependent data is based on a comparison of a first amount of memory usage in a first cycle of the horizontal sync signals with a second amount of memory usage in a second cycle of the horizontal sync signals.

15. The method as claimed in claim 14, further comprising:

(j) transmitting idle codes to the receiver when the frequency independent data is unavailable to be transmitted so as to maintain transmission of a constant data stream to the receiver.

16. The method as claimed in claim 14, further comprising:

(j) transmitting idle codes to the receiver when the header data is unavailable to be transmitted so as to maintain transmission of a constant data stream to the receiver.

17. The method as claimed in claim 14, further comprising:

(j) transmitting idle codes to the receiver when the header data and the frequency independent data are unavailable to be transmitted so as to maintain transmission of a constant data stream to the receiver.

18. A method for transmitting varying frequency dependent data comprising:

(a) receiving frequency dependent data, horizontal sync signals associated with the frequency dependent data, and a frequency dependent data clock signal, the frequency dependent data clock signal being associated with the frequency dependent data;

(b) converting the frequency dependent data to frequency independent data;

(c) determining a frequency dependent data clock number, the frequency dependent data clock number being a number of clock cycles of the frequency dependent data clock signal between two horizontal sync signals, and a reference clock number, the reference clock number being a number of clock cycles of a reference data clock signal between two horizontal sync signals;

(d) determining a ratio of the frequency dependent data clock number to the reference clock number;

(e) transmitting the determined ratio;

(f) transmitting, at a fixed rate, the frequency independent data and header data to a receiver, the fixed rate being a frequency greater than the frequency of the frequency dependent data clock signal;

(g) receiving the frequency independent data and the determined ratio;

(h) converting the frequency independent data to frequency dependent data based upon the received determined ratio; and (i) adjusting a frequency of the converted frequency dependent data based on an amount of a memory usage, wherein the frequency adjustment of the converted frequency dependent data is based on a comparison of amounts of memory usage at two consecutive rising edges of the horizontal sync signals.

19. The method of claim 1, wherein the frequency of the converted frequency dependent data is adjusted inversely to the amount of memory usage.

20. A method for transmitting varying frequency dependent data, comprising:

(a) receiving frequency dependent data having a pre-determined resolution format associated therewith, horizontal sync signals associated with the frequency dependent data, and a frequency dependent data clock signal associated with the frequency dependent data;

(b) determining timing information from the received frequency dependent data, the timing information being a ratio of a number of clock cycles of the frequency dependent data clock signal between two horizontal sync signals to a number of clock cycles of a reference data clock signal between two horizontal sync signals;

(c) converting the received frequency dependent data to frequency independent data;

(d) encoding the frequency independent data with the timing information determined from the received frequency dependent data;

(e) transmitting, at a fixed rate, the timing information encoded frequency independent data to a receiver;

(f) receiving the timing information encoded frequency independent data;

(g) extracting timing information from the timing information encoded frequency independent data;

(h) re-creating, based upon the extracted timing information, frequency dependent data having the pre-determined resolution associated therewith; and (i) adjusting a frequency of the re-created frequency dependent data based on an amount of a memory usage, wherein the frequency adjustment of the re-created frequency dependent data is based on a comparison of amounts of memory usage at two consecutive rising edges of the horizontal sync signals.

21. A component for transmitting graphical data generated by a graphical data source to a display device, comprising:

a circuit to receive frequency dependent data, horizontal sync signals associated with the frequency dependent data, and a frequency dependent data clock signal associated with the frequency dependent data from the graphical data source, the frequency dependent data having a resolution format and a data clock frequency associated therewith, and to generate timing information encoded frequency independent data therefrom, said timing information encoded frequency independent data including timing information, said timing information being a ratio of a number of clock cycles of the frequency dependent data clock signal between two horizontal sync signals to a number of clock cycles of a reference data clock signal between two horizontal sync signals;

a transmitter to transmit said timing information encoded frequency independent data at a fixed rate to the display device; and a control circuit to adjust a frequency of the received frequency dependent data based on an amount of a memory usage, wherein the frequency adjustment of the received frequency dependent data is based on a comparison of amounts of memory usage at two consecutive rising edges of the horizontal sync signals.

22. A system for transmitting graphical data generated by a graphical data source to a display device, comprising:

a communication channel;

a first circuit to receive frequency dependent data, horizontal sync signals associated with the frequency dependent data, and a frequency dependent data clock signal associated with the frequency dependent data from the graphical data source, the frequency dependent data having a resolution format and a data clock frequency associated therewith, and to generate timing information encoded frequency independent data therefrom, said timing information encoded frequency independent data including timing information, said timing information being a ratio of a number of clock cycles of the frequency dependent data clock signal between two horizontal sync signals to a number of clock cycles of a reference data clock signal between two horizontal sync signals;

a first transmitter, operatively connected to said communication channel, to transmit said timing information encoded frequency independent data at a fixed rate;

a second circuit, operatively connected to said communication channel, to receive the timing information encoded frequency independent data;

a third circuit, operatively connected to said second circuit, to extract timing information from the timing information encoded frequency independent data and to re-create, based upon the extracted timing information, frequency dependent data having the pre-determined resolution associated therewith, wherein a frequency of the re-created frequency dependent data is adjusted based on an amount of a memory usage; and a second transmitter, operatively connected to said third circuit, to transmit the frequency dependent data having the pre-determined resolution associated therewith to a display device, wherein the frequency adjustment of the re-created frequency dependent data is based on a comparison of amounts of memory usage at two consecutive rising edges of the horizontal sync signals.

23. A method for transmitting varying frequency dependent data, comprising:

(a) receiving frequency dependent data, horizontal sync signals associated with the frequency dependent data, and a frequency dependent data clock signal associated with the frequency dependent data;

(b) converting the frequency dependent data to frequency independent data;

(c) determining a frequency dependent data clock number, the frequency dependent data clock number being a number of clock cycles of the frequency dependent data clock signal between two horizontal sync signals, and a reference clock number, the reference clock number being a number of clock cycles of a reference data clock signal between two horizontal sync signals (d) determining a ratio of the frequency dependent data clock number to the reference clock number;

(e) transmitting the determined ratio;

(d) transmitting, at a fixed rate, frequency independent data and header data to a receiver, the fixed rate being a frequency less than the frequency of the associated data clock signal;

(g) receiving the frequency independent data and the determined ratio;

(h) converting the frequency independent data to frequency dependent data based upon the received determined ratio; and (i) adjusting a frequency of the converted frequency dependent data based on an amount of a memory usage, wherein the frequency adjustment of the converted frequency dependent data is based on a comparison of amounts of memory usage at two consecutive rising edges of the horizontal sync signals.

* * * * *